(12) United States Patent
Sayyar-Rodsari et al.

(10) Patent No.: US 9,147,153 B2
(45) Date of Patent: Sep. 29, 2015

(54) EMPIRICAL MODELING WITH GLOBALLY ENFORCED GENERAL CONSTRAINTS

(71) Applicant: ROCKWELL AUTOMATION TECHNOLOGIES, INC., Mayfield Heights, OH (US)

(72) Inventors: Bijan Sayyar-Rodsari, Austin, TX (US); Eric Jon Hartman, Austin, TX (US); Carl Anthony Schweiger, Austin, TX (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 223 days.

(21) Appl. No.: 13/670,187

(22) Filed: Nov. 6, 2012

(65) Prior Publication Data

US 2014/0129491 A1 May 8, 2014

(51) Int. Cl.
*G06F 15/18* (2006.01)
*G06N 3/02* (2006.01)

(52) U.S. Cl.
CPC .......................................... *G06N 3/02* (2013.01)

(58) Field of Classification Search
None
See application file for complete search history.

(56) References Cited

U.S. PATENT DOCUMENTS

| 7,058,617 | B1 * | 6/2006 | Hartman et al. | 706/16 |
|---|---|---|---|---|
| 7,184,992 | B1 * | 2/2007 | Polyak et al. | 706/46 |
| 7,315,846 | B2 * | 1/2008 | Hartman et al. | 706/16 |
| 7,599,897 | B2 * | 10/2009 | Hartman et al. | 706/15 |
| 2004/0199481 | A1 * | 10/2004 | Hartman et al. | 706/21 |
| 2005/0187643 | A1 * | 8/2005 | Sayyar-Rodsari et al. | 700/29 |
| 2008/0071394 | A1 * | 3/2008 | Turner et al. | 700/31 |
| 2008/0235166 | A1 * | 9/2008 | Sayyar-Rodsari et al. | 706/12 |
| 2010/0057222 | A1 * | 3/2010 | Turner et al. | 700/31 |
| 2011/0010135 | A1 * | 1/2011 | Boin | 703/1 |
| 2011/0320386 | A1 * | 12/2011 | Liano et al. | 706/12 |

OTHER PUBLICATIONS

Platt, John. "Sequential minimal optimization: A fast algorithm for training support vector machines." (1998).*
Reiter, Raymond. "A theory of diagnosis from first principles." Artificial intelligence 32.1 (1987): 57-95.*
Borrett, James E., Edward PK Tsang, and Natasha R. Walsh. "Adaptive constraint satisfaction." 15th UK Planning and Scheduling Special Interest Group Workshop. 1996.*
Turner, Paul, John Guiver, and Brian Lines. "Introducing the state space bounded derivative network for commercial transition control." American Control Conference, 2003. Proceedings of the 2003. vol. 6. IEEE, 2003.*

(Continued)

*Primary Examiner* — Kakali Chaki
*Assistant Examiner* — Daniel Pellett
(74) *Attorney, Agent, or Firm* — Fletcher Yoder P.C.

(57) ABSTRACT

In certain embodiments, a method includes formulating an optimization problem to determine a plurality of model parameters of a system to be modeled. The method also includes solving the optimization problem to define an empirical model of the system. The method further includes training the empirical model using training data. The empirical model is constrained via general constraints relating to first-principles information and process knowledge of the system.

23 Claims, 7 Drawing Sheets

(56) References Cited

OTHER PUBLICATIONS

Sayyar-Rodsari, Bijan, et al. "Extrapolating gain-constrained neural networks-effective modeling for nonlinear control." Decision and Control, 2004. CDC. 43rd IEEE Conference on. vol. 5. IEEE, 2004.*

Sayyar-Rodsari, Bijan, Carl Schweiger, and Eric Hartman. Development of PUNDA (Parametric Universal Nonlinear Dynamics Approximator) Models for Self-Validating Knowledge-Guided Modelling of Nonlinear Processes in Particle Accelerators\ & Industry. No. DOE/ER/86225-1 Final Report. Pavilion Technologies, Inc, 2007.*

* cited by examiner

EMPIRICAL MODELING WITH GLOBALLY ENFORCED GENERAL CONSTRAINTS

BACKGROUND

The present disclosure relates generally to control systems, predictive systems, and optimization systems that utilize empirical models with globally enforced general constraints.

Empirical models are typically used in the modeling of complex processes, including control systems, predictive systems, and optimization systems. During empirical modeling, historical data may be used as training data that aids in defining the empirical model. The trained empirical model, for example, embodied in a controller, may then present relatively accurate results within the range of the training data. However, when the trained model encounters inputs outside of the training range, the extrapolated results may not be as accurate. Further, other properties of the training data, such as quality of the data fit, may not be sufficient to render the empirical model useful.

BRIEF DESCRIPTION

In an embodiment, a method includes formulating an optimization problem to determine a plurality of model parameters of a system to be modeled. The method also includes solving the optimization problem to define an empirical model of the system. The method further includes training the empirical model using training data. The empirical model is constrained via general constraints relating to first-principles information and process knowledge of the system.

In another embodiment, a system includes an empirical model configured to receive inputs and to transform the inputs into outputs such that a first asymptotic behavior of the empirical model conforms to a desired second asymptotic behavior that is used to determine the empirical model. The empirical model includes first-principles information and process knowledge that has been introduced into the empirical model as general constraints during general constrained training of the empirical model.

In another embodiment, a tangible computer-readable medium includes code adapted to implement an empirical model. An asymptotic analysis is used to define the empirical model. In addition, the empirical model includes first-principles information and process knowledge that has been introduced into the empirical model via general constrained training.

DRAWINGS

These and other features, aspects, and advantages of the present invention will become better understood when the following detailed description is read with reference to the accompanying drawings in which like characters represent like parts throughout the drawings, wherein.

Figure 3:
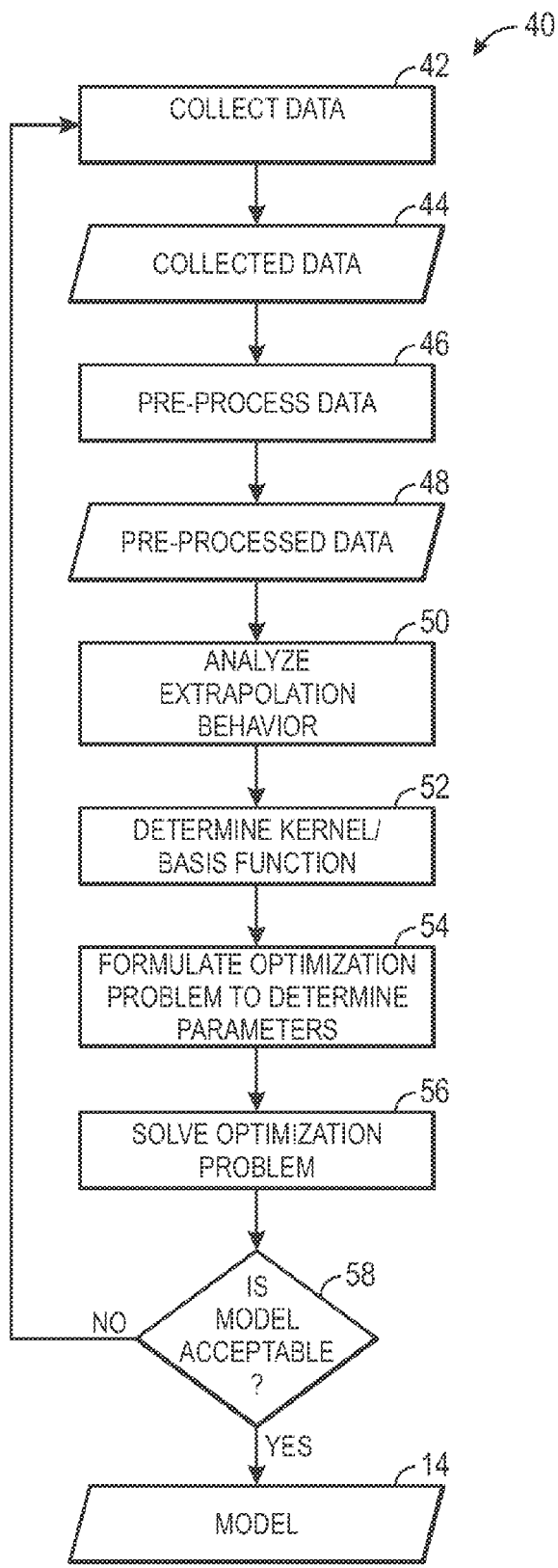
FIG. 3 is a flow diagram of an embodiment of logic, in accordance with aspects of the disclosure.
Figure 5:
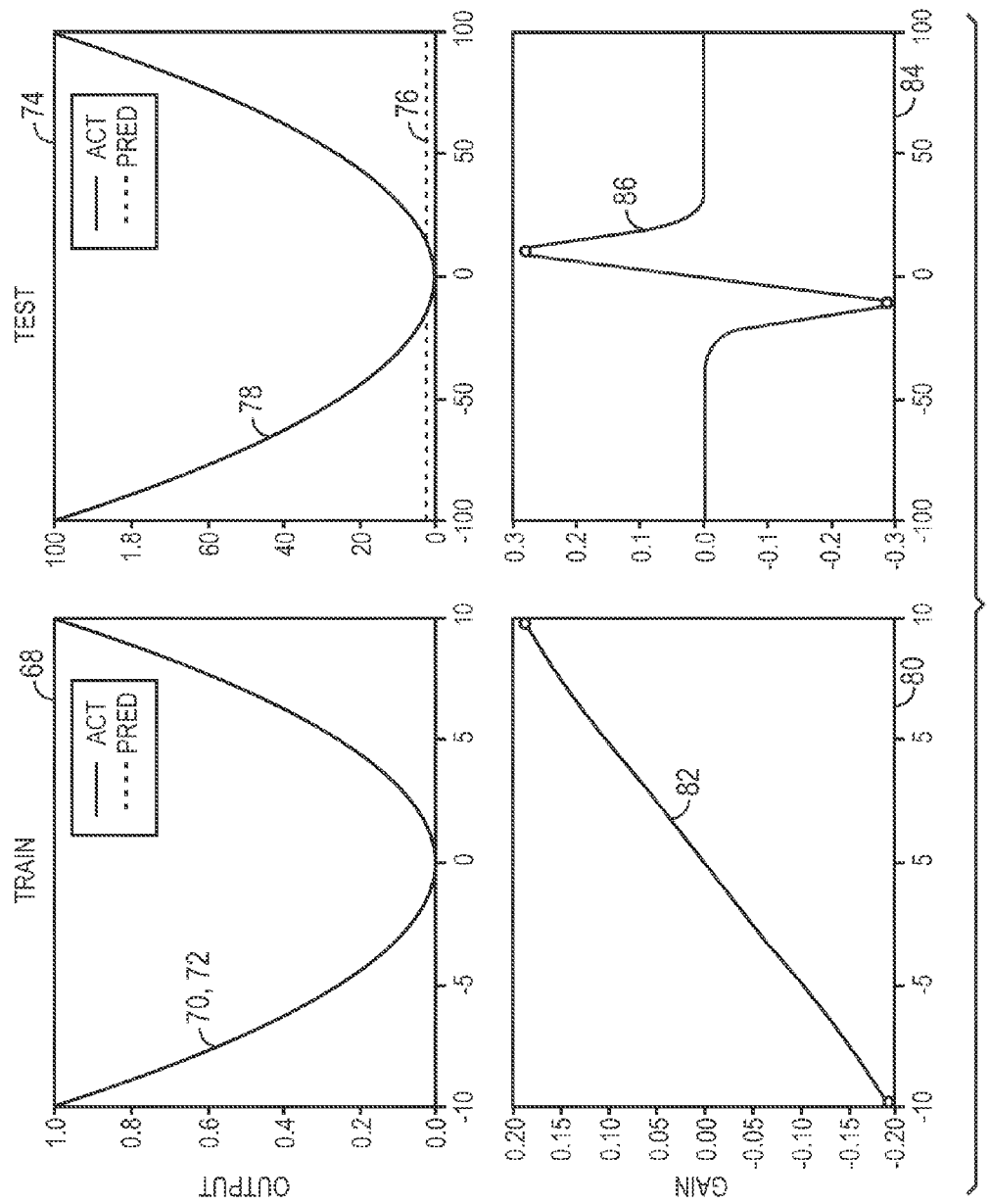
Figure 6:
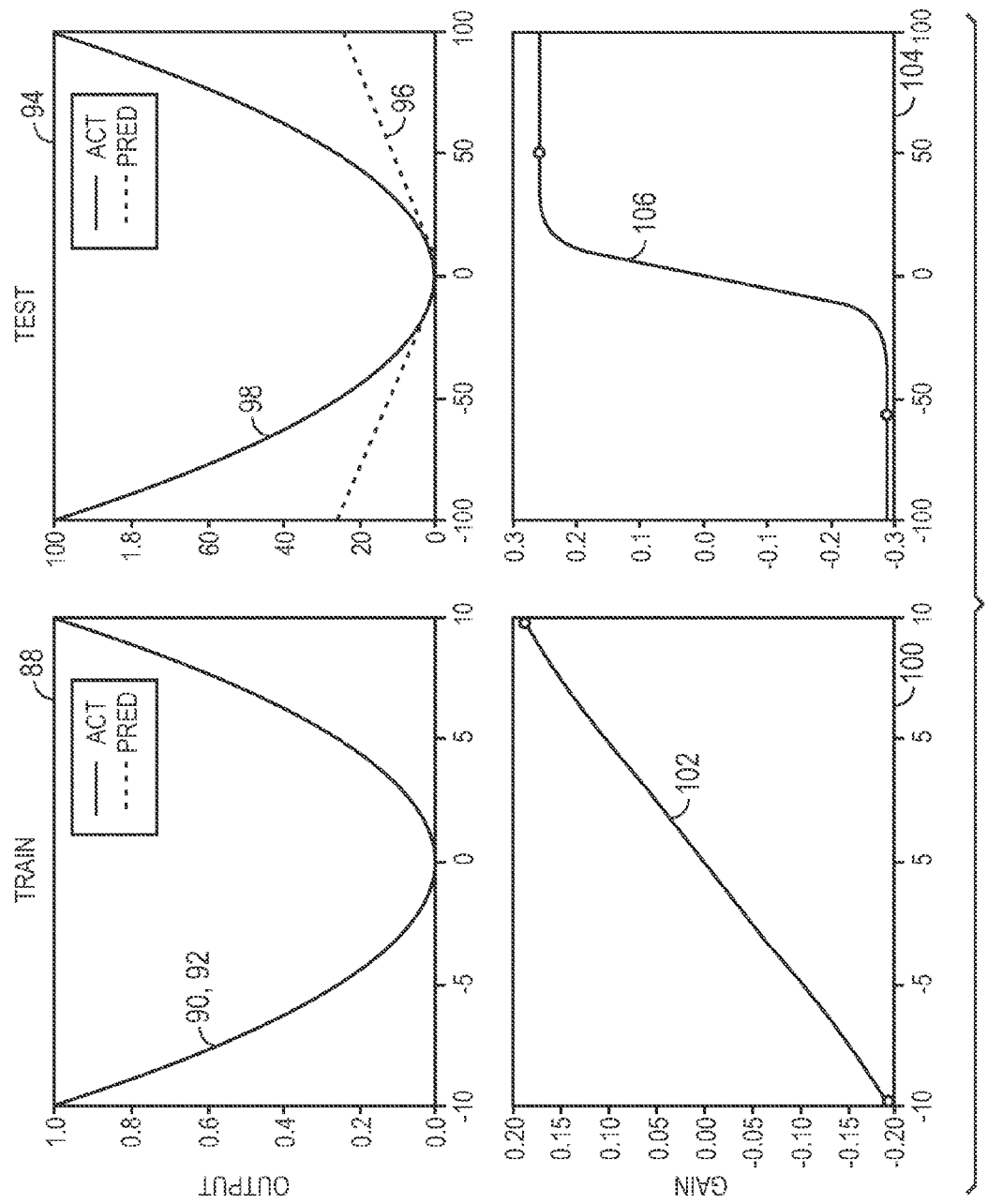
Figure 7:
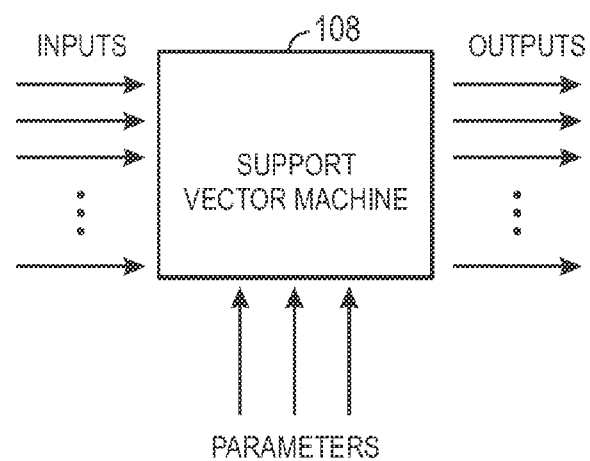
Figure 8:
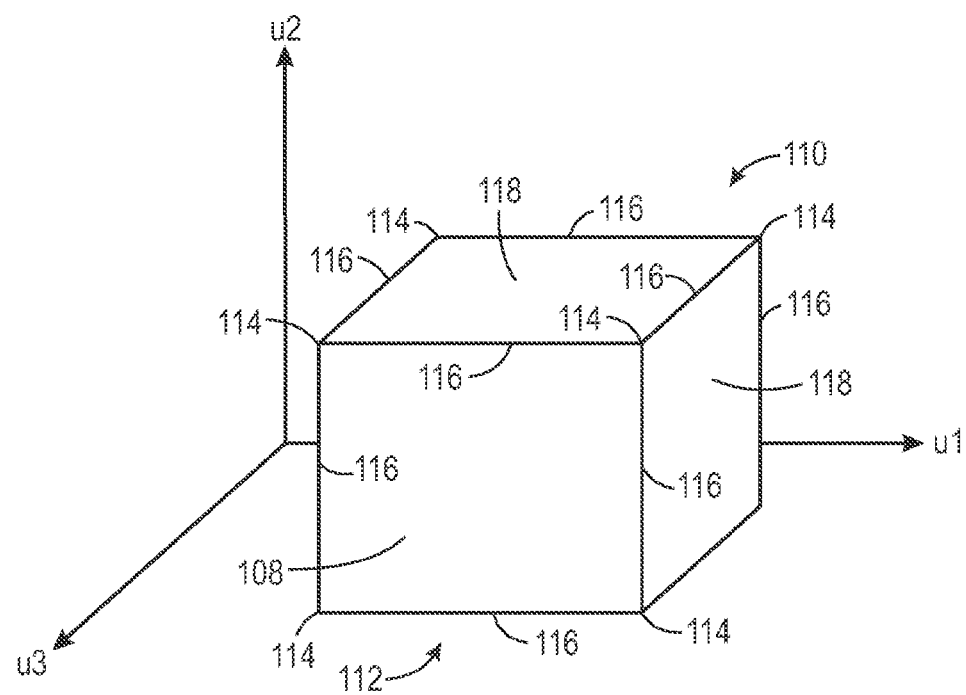

FIG. 5 includes graph diagrams of test and training results of a neural network, in accordance with aspects of the disclosure:

FIG. 6 includes graph diagram of test and training results of the neural network of FIG. 3, in accordance with aspects of the disclosure;

FIG. 7 is a block diagram of an exemplary support vector machine, in accordance with aspects of the disclosure; and FIG. 8 represents a model space of a normalized model with three inputs, in accordance with aspects of the disclosure.

DETAILED DESCRIPTION

The present disclosure provides novel techniques for defining controllers, predictive systems, and/or optimization systems by utilizing empirical models that are capable of incorporating desired extrapolation properties, such as a candidate basis/kernel function $\phi_b(\bullet)$, as factors used to determine the structure of the empirical model. Once the model has been defined, the model may then be utilized in controller embodiments, model predictive control embodiments, environmental management embodiments, production performance management embodiments, plant operations optimization embodiments, industrial scheduling systems embodiments, and so forth.

An empirical model may be first defined using the following general equation:

$$f(x) = \sum_{b}^{N_B} \varphi_b(w_b, x)$$

where $x \in \mathbb{R}^{N_u}$ is the $N_u$-dimensional input vector, $f(\bullet): \mathbb{R}^{N_u} \to \mathbb{R}^{N_y}$ is a linear or nonlinear mapping from the $N_u$-dimensional input space to $N_y$-dimensional output space, $w_b$ is the parameters of the basis/kernel function, $\phi_b(\bullet)$ that are determined in the course of the modeling process, and $N_B$ is the number of the basis/kernel functions used for the approximation. Accordingly, the model is capable of utilizing a set of inputs, processing the inputs through a set of basis/kernel functions $\phi_b(\bullet)$, so as to arrive at a result. The model may be incorporated into various systems, such as control systems, predictive systems, optimization systems, or a combination thereof. The model results may thus be used, for example, as controller setpoints, predictive finish times of industrial processes, optimization of production line quality, and so forth.

In one example, a method of empirical modeling includes determining the model parameters $w_b$ given the obtainable data. The empirical model may then be further defined by the use of training data. That is, the obtainable data may be split into a training data subset and a test data subset. A training process may then be employed where the training data is presented as inputs to the model, and the model output compared to desired results. Any errors in the output may then be used to adjust the parameters (e.g., weights, biases, or tuning parameters) of the model until the model generates valid results within a certain margin of error. The test dataset may then be used as inputs to verify and validate the model. For example, the test dataset may be used as inputs into the model, and the results then verified as suitable for use in a production environment. Based on the quality and on the range of the training data, such an approach may be useful. However, in many instances, it is difficult for the model to extrapolate outside of the training data. Accordingly, the extrapolation property of the model may be as important as the model's accuracy over the training dataset. Indeed, even if the resulting model exhibits a good quality of fit (i.e., high fidelity) over the training data set, this model property by itself may not be sufficient to render the model useful.

For example, when the model is used in industrial control, the gain of the model (e.g., the first order derivative of the output with respect to the input) may trend toward zero, especially in extrapolation regions. Zero model gains may result in infinite controller gains, which may not be useful in industrial applications. The extrapolation regions of the empirical model may also be susceptible to gain inversion. Model gain inversion may result, for example, in valves opening when they should be closing (and vice versa). Accordingly, in certain embodiments described in more detail herein, the empirical modeling process is altered by making the analysis of the extrapolation properties of the empirical model an integral part of the selection of the basis/kernel function $\phi_b(\cdot)$. That is, the basis/kernel function $\phi_b(\cdot)$ will be added to the model only if the asymptomatic behavior of the approximate function can emulate the known and/or the desired asymptomatic behavior of the actual system that is described by $f(x)$. More specifically, while the detailed behavior of the system $f(x)$ may not be known, the information on asymptotic behavior of the system may be available. By incorporating the system's asymptotic information, the resultant empirical model may be capable of a superior extrapolation behavior. Some example asymptotic behaviors may be as follows:

$$\lim_{x \to \infty} f(x) = l^\infty(x); \quad (2)$$

$$\lim_{x \to -\infty} f(x) = l^{-\infty}(x); \quad (3)$$

$$\lim_{x \to \infty} \frac{\delta^2 f_i}{\delta x_i \delta x_j}(x) = l^2_{ij,l}(x); \quad (4)$$

$$\lim_{x \to \infty} \frac{\delta f_j}{\delta x_i}(x) = l^1_{ij}(x). \quad (5)$$

Where $x \to \infty$ is used as a shorthand notation to denote various ways by which the asymptotic behavior of the system may be manifested. For example, a trend towards infinity may be described as $x_i \to \infty$ for all $i \in \{1, \ldots, N_u\}$. Another example may be when all of the inputs of the input vector (or set) x are constant except for the j-th component such that $x_j \to \infty$. For the examples cited in equations 2-5 above, the asymptotic behavior could assume the following forms. $l^\infty(x)$ is the asymptotic behavior of f(x) as all components of the input vector x grow towards $+\infty$. One example includes a constant, $l^\infty(x)=C$. A second example includes a linear function of inputs $l^\infty(x)=a.x$. In these examples. C and a are known constants. $l^{-\infty}(x)$ is the asymptotic behavior of f(x) as all elements of x go to $-\infty$. $l_{ij}^1(x)$ is the asymptotic behavior of the gain from the i-th input to the j-th output as the i-th component of the input vector x grows towards $+\infty$ while all other components of the input vector are kept constant. $l_{ij,l}^2(x)$ is the asymptotic behavior of the partial derivative of $$\frac{\delta f_i}{\delta x_j}$$

with respect to the i-th input $x_i$, as $x_i$ and $x_j$ go to $\infty$. It is to be understood that in other examples, other asymptotic behaviors could be used. Indeed, any number and type of asymptotic behaviors are capable of being used with the techniques described in further detail below.

Figure 1:
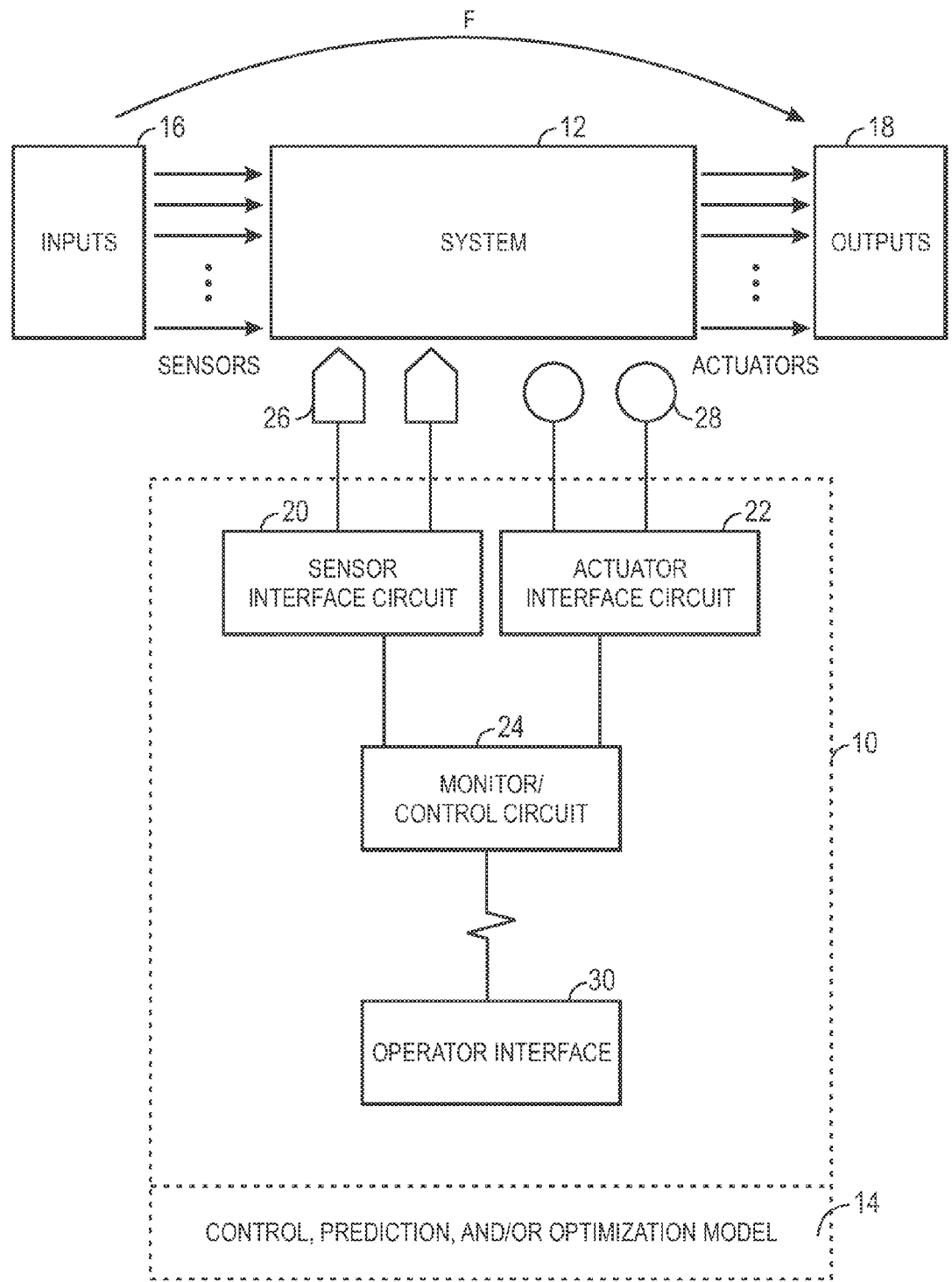
FIG. 1 is a block diagram a plant control, prediction, and optimization system, in accordance with aspects of the disclosure.

FIG. 1 illustrates an embodiment of an industrial controller 10 that is capable of controlling embodiments of a system 12. The system 12 may include a plurality of industrial system embodiments such as a manufacturing plant, an oil refinery, a chemical plant, a power generation facility, and others. The industrial controller 10 may include embodiments of an empirical model 14 capable of managing all aspects of the system 12, including control, prediction, and/or optimization. Indeed, the model 14 may be capable of control, prediction, and optimization of the system 12. For example, the model 14 may be capable of process control, quality control, energy use optimization (e.g., electricity use optimization, fuel use optimization), product mix management, financial optimization, and so forth.

The system 12 receives a set of inputs 16 and produces a set of outputs 18. The inputs 16 may include process inputs (e.g., types of material, quantities of material, product delivery schedules), financial inputs (e.g., accounting data, economic data), regulatory inputs (e.g., emission constraints, regulatory rules), and so forth. The outputs 18 may include manufactured products, refined products (chemicals, gasoline, coal), power (e.g., electricity), and so forth. Indeed, the system 12 is capable of receiving any number of inputs 16 and using the inputs 16 to produce a set of outputs 18.

In certain embodiments, the industrial controller 10 includes a sensor interface circuit 20, an actuator interface circuit 22, and a monitor/control circuit 24. The sensor interface circuit 20 is capable of communicating with a plurality of sensors 26. The sensors 26 may be capable of sensing a number of inputs 16 as well as signals internal to the system 12, such as temperature measurements, liquid levels, chemical composition, flow measurements, pressure measurements, electrical measurements, and so forth. Accordingly, the sensors 26 may include temperature sensors, optical sensors, chemical sensors, pressure sensors, flow volume sensors, valve position sensors, speed sensors, vibration sensors, voltage sensors, amperage sensors, and so forth. Indeed, any type of sensing device may be used. The sensor interface circuit 20 may interface with the monitor/control circuit 24 so as to communicate measurements and other data based on the inputs 16 and on signals from the sensors 26. The monitor/control circuit 24 may then transform the inputted data into control signals suitable for use by the actuator interface circuit 22. The actuator interface circuit 22 may utilize a plurality of actuators 28 to perform any number of actions such as adjusting a valve position, moving a conveyor belt, controlling a robotic device, and so forth.

An operator interface 30 is communicatively connected with the monitor/control circuit 24 and used to aid an operator in interfacing with the monitor/control circuit 24. The operator interface 30 may be capable of programming the monitor/control circuit 24, modifying data, modifying the model 14, and so forth. In certain embodiments, the operator interface 30 may be remotely located and may communicate through a network such as a local area network (LAN), the internet, or a wide area network (WAN). The operator interface 30 may also be capable of interacting with the model 14 in order to modify certain aspects of the model 14 as described in more detail below with respect to FIG. 2.

Figure 2:
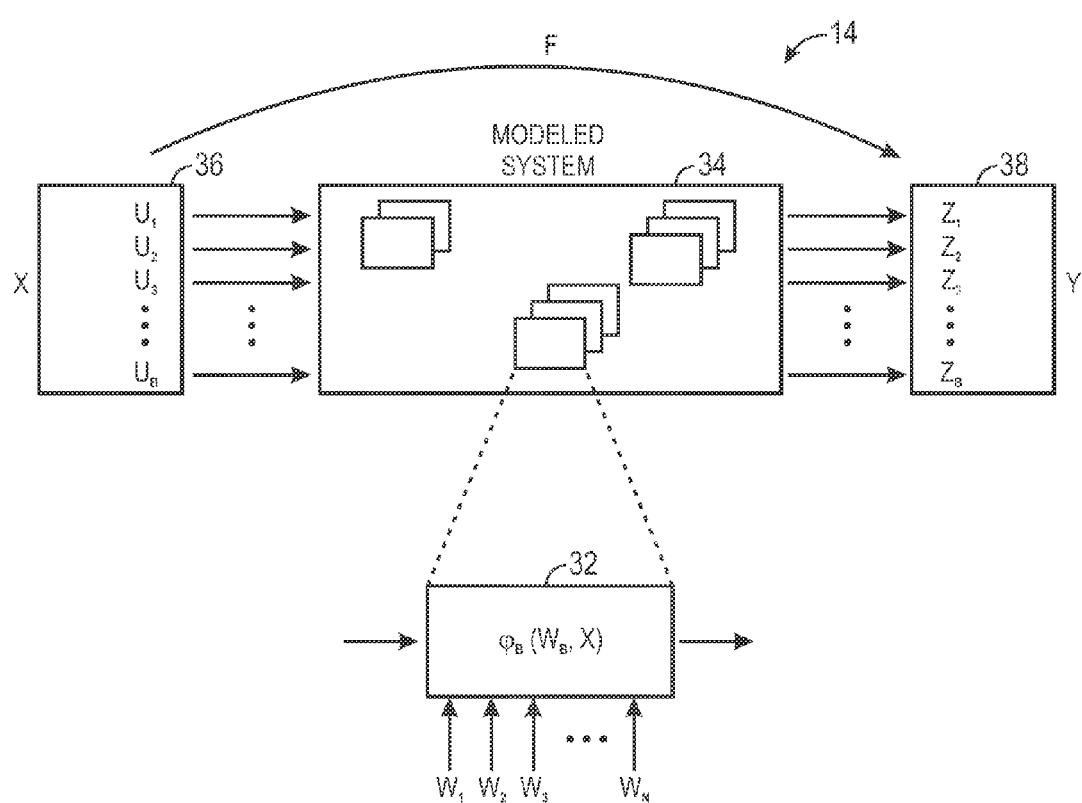
FIG. 2 is a block diagram of an embodiment of an empirical model, in accordance with aspects of the disclosure.

FIG. 2 is a block diagram of the empirical model 14 capable of control, prediction, and/or optimization modalities. As mentioned above, the empirical model 14 is capable of modeling almost all aspects of systems 12. Accordingly, the model 14 includes a plurality of basis/kernel equations $\phi_b(w_b,x)$ 32 that may be used to describe a modeled system 34. Indeed, by using techniques described herein, including the equations $\phi_b(w_b,x)$ 32, the modeled system 34 may be suitable for modeling any number of systems 12. In certain embodiments, such as neural network embodiments, the equation $\phi_b(w_b,x)$ 32 may be used as a basis/kernel equation as described with more detail below with respect to FIG. 4. In other embodiments, such as support vector machine embodiments, the equation $\phi_b(w_b,x)$ 32 may be used as a kernel/basis function as described with more detail below with respect to FIG. 7. More generally, the equation $\phi_b(w_b,x)$ 32 may be used to express the empirical model 14 in the form $$f(x) = \sum_b^{N_B} \varphi_b(w_b, x),$$

as mentioned above, where $N_B$ is the number of the basis/kernel functions used for the approximation of the modeled system 34. A set of inputs x 36 where $x \in \mathbb{R}^{N_u}$ is the $N_u$-dimensional input vector, may be used as inputs into the modeled system 34. The modeled system 34 may then generate a plurality of outputs y 38 where $y \in \mathbb{R}^{N_z}$ is the $N_y$-dimensional output space.

The equation $\phi_b(w_b, x)$ 32 may include parameters $w_b$ that are determined in the course of the modeling process. For example, parameters $w_b$ may be incorporated corresponding to weights of links between nodes, biases of nodes, tuning factors, and so forth. In certain embodiments, a method for modeling includes determining the model parameters $w_b$ given the available data and any knowledge about the modeled system 34. Indeed, such embodiments are capable of making the analysis of the extrapolation properties of the empirical model 14 an integral part of the selection of the basis/kernel function $\phi_b(\cdot)$. In these embodiments, an asymptotic behavior of the system 12 may be known or desired. That is, the detailed behavior of the system 12 may not be known, but the more general asymptotic behavior may be known, or if not known, a certain asymptotic behavior may be desired. Accordingly, a basis/kernel function $\phi_b(\cdot)$ may be selected for use as equation $\phi_b(w_b,x)$ 32 such that the asymptotic behavior of the modeled system 34 matches that of the actual system 12. Some example asymptotic behaviors and corresponding exemplary basis/kernel functions are described below.

For constant asymptotic behavior where $\phi_b(x) \sim c$:

$$\phi_b(x)=1/(1+\exp(-x)); \quad (6)$$

$$\phi_b(x)=\tan h(x); \quad (7)$$

$$\phi_b(x)=x/\sqrt{(1+x^2)}; \quad (8)$$

$$\phi_b(x)=x/(1+|x|). \quad (9)$$

For linear asymptotic behavior where $\phi_b(x) \sim x$:

$$\phi_b(x)=\log(1+\exp(x)). \quad (10)$$

For logarithmic asymptotic behavior where $\phi_b(x) \sim \log(x)$:

$$\phi_b(x)=\log(1+x^2); \quad (11)$$

$$\phi_b(x)=\log(\sqrt{1+x^2}). \quad (12)$$

For quadratic asymptotic behavior where $\phi_b(x) \sim x^2$:

$$\phi_b(x)=\log(1+\exp(x^2)); \quad (13)$$

$$\phi_b(x)=\log^2(1+\exp(x)). \quad (14)$$

For exponential asymptotic behavior where $\phi_b(x) \sim \exp(x)$:

$$\phi_b(x)=\exp(x); \quad (15)$$

$$\phi_b(x)=\sin h(x). \quad (16)$$

For quasi-periodical asymptotic behavior where $\phi_b(x) \sim \sin(x)$:

$$\phi_b(x)=\sin(x). \quad (17)$$

By incorporating the asymptotic behavior of the system 12, the resulting modeled system 34 may be capable of a substantially improved extrapolation behavior, including the ability to more closely model the actual system 12.

FIG. 3 is a flow chart depicting logic 40 that may be used to define the model 14. The logic 40 may collect (block 42) data 44. The data 44 may include sensor 26 data, actuator 28 data, system inputs 16, and/or any data suitable for observing the behavior of the actual system 12. The data collection (block 42) may be automated, that is, the data may be logged into a system through a data logger, extracted from existing databases, submitted from an external source, and so forth. The data collection (block 42) may also be manual, that is, an operator may enter certain data points of interest. Indeed, any number of data collection systems and methodologies may be used.

The collected data 44 may then be pre-processed (block 46) so as to render the collected data 44 more useful for empirical modeling. For example, a filter such as a low-pass filter may be utilized to filter noise out of the collected data 44. In another example, correlated data may be removed. Removing correlated data may be useful in facilitating clusterability and discrimination in the data. The process data 44 may also be pre-processed (block 46) so as to place the data 44 in a common time scale. The data 44 may also be normalized during pre-processing (block 46), for example, by scaling the data 44 into a numeric range appropriate for use by the model 14. Accordingly, the data 44 may thus be transformed into pre-processed data 48.

The pre-processed data 48 may then be utilized as part of an analysis of the extrapolation behavior of the system 12. The extrapolation behavior may use knowledge available about the system 12 to determine the extrapolation behavior of the system 12. In one example, the pre-processed data 48 may be analyzed and used to determine any asymptotic tendencies of the system 12. For example, techniques such as linear regression (e.g., least squares, adaptive estimation, and ridge regression), the method of dominant balance (MDB), and/or others may be used. Indeed, any number of methods useful in the asymptotic analysis of the system 12 may be employed. In cases where the asymptotic behavior of the system 12 is not known, then a desired asymptotic behavior may be used. For example, a linear behavior may suitably control a heating process, while a constant behavior may suitably control a mixing process. Accordingly, an extrapolation behavior 50 may be found or defined.

The basis/kernel function $\phi_b(\cdot)$ capable of rendering the extrapolation behavior 50 may be selected (block 52). As mentioned above, any number of equations may be used to define the basis/kernel function $\phi_b(\cdot)$, including equations (6)-(17). Indeed, by incorporating the extrapolation behavior of the system 12 into the selection of the basis/kernel function $\phi_b(\cdot)$, the modeled system 34 may be capable of more closely modeling the actual system 12 (i.e., exhibiting higher fidelity). Once the basis/kernel function $\phi_b(\cdot)$ has been selected (block 52), the logic 40 may then formulate an optimization problem to determine the model's parameters (block 54). The optimization problem may be formulated based, for example, on the modeling goals (e.g., reducing the modeling error), system constraints (e.g., demonstrating a desired asymptotic behavior), and so forth.

The logic 40 may then solve the optimization problem to determine the model's parameters (block 56). In certain embodiments, this training process may employ a gradient descent method. In gradient descent, one takes steps proportional to the negative of the gradient of the optimization function at its current point. The function may typically decrease fastest if one moves in a gradient towards a local minimum. Accordingly, the gradient descent may find the local minima through the stepwise moves. The set of model parameters $w_h$ may thus be ascertained. The logic 40 may then analyze the resulting model 14 to determine if the resulting model 14 is acceptable (decision 58). In certain embodiments, the acceptability of the model may depend on the model's accuracy, the model's high-order behavior (e.g., gain or second order derivatives), and the model's extrapolation properties. In these embodiments, test data may be used as inputs to the model 14, and the outputs of the model may then be analyzed to see if they are adequate. For example, the outputs may be analyzed to see if control embodiments of the model 14 adequately respond to the test data by issuing appropriate control signals. Similarly, predictive embodiments of the model 14 may use the test data as inputs of, for example, a simulation, and the simulation results may be studied to verify the quality of the simulation. Likewise, optimization modalities of the model 14 may use the test data as inputs to optimization embodiments of the model 14, and the outputs of the optimization embodiments may be analyzed to determine their suitability to accurately optimize certain aspects of the system 12 such as cost, production outputs, power generation, and so forth. If the model 14 is deemed not suitable for use, then the logic 40 may loop to block 42 to repeat the model's training process. Indeed, the model 14 may be iteratively trained so as to achieve an accuracy, a high-order behavior, and extrapolation properties suitable for modeling the system 12. The model 14 may include neural network and/or support vector machine embodiments capable of employing the techniques described herein, including asymptotic analysis techniques, capable of superior extrapolation properties that may be especially useful in control, prediction, and optimization applications.

Figure 4:
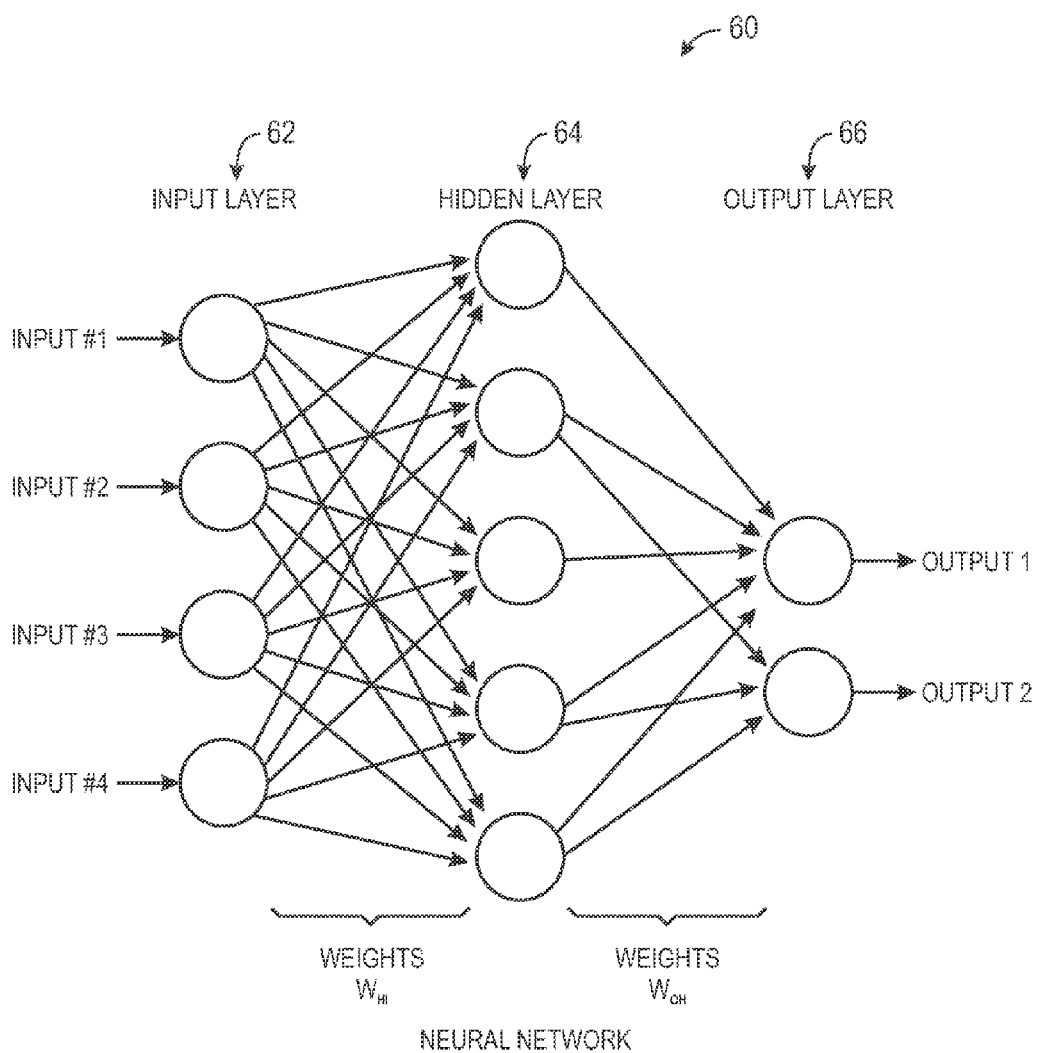
FIG. 4 is a diagram of an exemplary embodiment of a neural network, in accordance with aspects of the disclosure.

FIG. 4 depicts an embodiment of a neural network 60 capable of employing the techniques described herein. More specifically, the illustrated neural network 60 may be trained by using the logic 40 as described above with respect to FIG. 3 to incorporate asymptotic analysis. In the illustrated embodiment, the neural network 60 includes a plurality of input nodes (i.e., input layer) 62, a plurality of hidden nodes (i.e., hidden layer) 64, and a plurality of output nodes (i.e., output layer) 66. Accordingly, the neural network 60 is a multi-layer, feed-forward network with linear outputs having a single hidden layer 64. It is to be understood that while the depicted embodiment illustrates a specific neural network architecture, other architectures having more or less nodes, as well as having more than one hidden layer, may be used. Indeed, the techniques herein may be incorporated in any number of neural network architectures.

In the illustrated embodiment, i, h, and o denote the indexes of the nodes in the input layer 62, hidden layer 64, and output layer 66, respectively. Weights between output and hidden nodes are denoted by $w_{oh}$ and weights between hidden and input nodes are denoted by $w_{hi}$. Biases of the hidden and output nodes are $b_h$ and $b_o$, respectively. For the hidden nodes, $u_h$ is the weighted sum input, $f(\cdot)$ is the transfer function, and $z_h$ is the output of the hidden nodes. The variable $y_o$ is the o-th component of the multi-output process $f(\cdot)$. Accordingly, the equations below represent the inputs $u_h$, hidden layer output $z_h$, and the o-th component of $f(\cdot)$:

$$u_h = \sum_i (w_{hi} x_i) + b_h; \tag{18}$$

$$z_h = f(u_h); \tag{19}$$

$$y_o = \sum_h (w_{oh} z_h) + b_o. \tag{20}$$

The o-th component of the multi-output process $f(\cdot)$ may be expressed so as to incorporate the more generic $\phi(\cdot)$ as follows:

$$y_o = \sum_h \overbrace{\left[ w_{oh} \cdot f\left( \sum_i (w_{hi} x_i) + b_h \right) + b_o \right]}^{\varphi_{o,h}(\cdot)} \tag{21}$$

Where $\phi_{o,h}(\cdot)$ is the o-th component of the basis/kernel function of the neural network 60, and h is the index that varies over the nodes in the hidden layer 64. As mentioned above, the higher-order behaviors, such as the sensitivity (i.e., gain) of the model 14, may be useful in certain embodiments such as control embodiments. Accordingly, the sensitivity $$\frac{dy_o}{dx_i}$$

or the gain $K_{oi}$ of the output $y_o$ with respect to the input can be derived as follows:

$$K_{oi} = \frac{dy_o}{dx_i} = \sum_h w_{oh} w_{hi} f'(u_h) = \sum_h w_{ohi} * f'(u_h). \tag{22}$$

Where $f'(u_h)$ is the derivative of the transfer function $f(u_h)$, and the product $w_{oh} w_{hi} = w_{ohi}$ is used to emphasize that the gain of a network is a weighted sum of the derivative of its hidden nodes. Sigmoidal functions (e.g., S-shaped functions) such as $f(x)=1/(1+\exp(-x))$ or $f(x)=\tan h(x)$ may be used as activation functions for the neural network 60. However, the emphasis given has not been the asymptotic behavior of the neural network 60 but rather on the quality of the neural network's 60 fit over the training data. Indeed, in other approaches, the architecture of the neural network 60 may have to be modified extensively, for example, by adding additional hidden layers 64, in order to arrive at a neural network 60 that may exhibit improved extrapolation behaviors. By way of contrast, the techniques disclosed herein allow for the use of a single hidden layer 64. By incorporating the extrapolation properties of a node as a deciding factor in the selection of the activation functions, and by using exemplary non-sigmoidal activation functions $f(x)=1/(1+\exp(x))$ or $f(x)=1/(1+\exp(x^2))$, the neural network 60 may be trained so as to result in embodiments that overcome the zero model gain and gain inversion problems. In certain embodiments, the neural network 60 may be trained by using the logic 40 of FIG. 3.

Sigmoidal functions may be used in neural networks 60 because of their ability to fit the training data well. However, sigmoidal functions are monotonic and bounded. The derivatives of the sigmoidal functions are also bounded, with the gain assuming its maximum when input is at zero and decreasing towards zero as the input moves away from zero.

As a consequence, the neural network gain (i.e., the weighted sum of the sigmoidal function's derivative), also trends to zero as the input moves away from zero. While such behavior may work well in applications that require bounded outputs, other applications such as control applications, typically avoid zero gains. For applications where zero and small gains are to be avoided, a choice of transfer function (i.e., activation function) for the neural network 60 would be as follows:

$$f(u) = \log(1 + \exp(u)) \Rightarrow \begin{cases} u \to -\infty \text{ then } f(u) \to 0 \\ u \to +\infty \text{ then } f(u) \to u \end{cases} \quad (23)$$

The gain equations will be as follows:

$$f'(u) = 1/(1 + \exp(-u)) \Rightarrow \begin{cases} u \to -\infty \text{ then } f'(u) \to 0 \\ u \to +\infty \text{ then } f'(u) \to 1 \end{cases} \quad (24)$$

The activation function in equation (23) is a monotonic but unbounded function whose derivative, equation (24), is also monotonic and bounded in [0, 1]. Consequently, the neural network 60 utilizing such functions will be monotonic with bounded overall gain:

$$K_{oi}^{min} \leq \left( \sum_h w_{ohi} * f'(u_h) \right) \leq K_{oi}^{max} \quad (25)$$

$K_{oi}^{min}$ and $K_{oi}^{max}$ can be determined by the user and enforced during training by identifying the suitable gain bounds for the system 12 being modeled. Indeed, the bounded gain can be expressed in terms of the hidden node layer 64. The hidden node layer 64 may be divided into two groups, $h_p$ for hidden nodes with $w_h = w_{oh}w_{hi} \geq 0$ and $h_n$ for the hidden nodes with $w_h = w_{oh}w_{hi} < 0$. With $0 \leq f'(\bullet) \leq 1$ for all input values, the gain bounds on $K_{oi}$ may be obtained as follows:

$$\max(K_{oi}) \leq \sum_{hp} w_{oh}w_{hi}; \quad (26)$$

$$\min(K_{oi}) \geq \sum_{hn} w_{oh}w_{hi}. \quad (27)$$

The upper and lower bounds of equations (26) and (27) are valid for all inputs. However, it may be possible for the gain bounds not to be tight, that is, some gain may be far from the bounds. However, by analyzing the asymptotic gain for the neural network 60, one can derive $K_{oi}^+$ for $x_i \to \infty$ and $K_{oi}^-$ for $x_i \to -\infty$ as follows:

$$K_{oi}^+ = \sum_{hip} w_{oh}w_{hi}; \quad (28)$$

$$K_{oi}^- = \sum_{hin} w_{oh}w_{hi}; \quad (29)$$

Where hip are the nodes in the hidden layer 64 with $w_{hi} \geq 0$ and hin are the nodes in the hidden layer 64 with $w_{hi} < 0$. Accordingly, this asymptotic analysis allows the training of the neural network 60 as described above with respect to FIG. 3 where the following optimization problem may be solved:

$$\begin{cases} \min w_{hi}, b_h, w_{oh}, b_o \sum_d L(y_d - y_o) \\ Eq.(18\text{-}20) \\ \text{subject to:} \quad K_{oi}^{min} \leq \left( K_{oi} = \sum_h w_{ohi}f'(u_h) \right) \leq K_{oi}^{max} \end{cases} \quad (30)$$

Where $w_{hi}$, $b_h$, $w_{ho}$, $b_o$ are the neural network parameters, d indexes over the data points, $L(\bullet)$ is any appropriate loss function as a 1-norm, 2-norm, or $\infty$-norm, and $K_{oi}$ is the neural network gain to be bounded between known and/or desired gain constraints $K_{oi}^{min}$ and $K_{oi}^{max}$. Indeed, the neural network 60 created and trained by using these techniques may be capable of improved extrapolation properties, including the avoidance of gain trending towards zero as well as gain inversion.

Further, the neural network 60 may be capable of using unscaled input/output variables after training. As mentioned above, scaling may be used during training to pre-process the raw data. Once the neural network 60 has been architected and trained, raw inputs are typically scaled to conform with the scaling performed during training. Similarly, outputs are scaled to conform, for example, to actual engineering units. In certain embodiments, it may be possible to avoid the scaling of inputs and outputs after training. Indeed, in these embodiments, the neural network 60 may be capable of transforming the trained weights and biases such that the neural network 60 may use raw variables in engineering units directly.

As described above, the neural network 60 is a multi-layer, feed-forward neural network with one hidden layer 64 and linear output nodes 66. Let the subscripts i, h, and o index the nodes in the input layer 62, hidden layer 64, and output layer 66, respectively. If upper case names denote unscaled variables (e.g., raw or engineering units), while lower case names denote scaled variables, $X_i/x_i$ denotes the unscaled/scaled inputs, and $Y_o/y_o$ denotes the unscaled/scaled outputs. Weights between output and hidden nodes are denoted by $w_{oh}$, and weights between hidden and input nodes are denoted by $w_{hi}$. Biases of the hidden and output nodes are $b_h$ and $b_o$, respectively. For the hidden nodes, $u_h$ is the weighted sum input, $f(\bullet)$ is the transfer function, and $z_h$ is the output of the hidden nodes. For training purposes, the input and output data may be scaled and translated as follows:

$$x_i = S_i X_i + T_i; \quad (31)$$

$$y_o = S_o Y_o + T_o. \quad (32)$$

The network values are given by equations (14)-(16) above. After training, rather than incurring a time and resource penalty to scale and unscale data points during run time, it may be more efficient to rescale the neural network 60 and then use the raw data directly during run time. The exemplary equations used for scaling the weights and biases after training in terms of the data scaling used during training are as follows:

$$u_h = \sum_i (w_{hi}x_i) + b_h; \quad (33)$$

$$= \sum_i [w_{hi}(S_i X_i + T_i)] + b_h; \quad (34)$$

$$= \sum_i (w_{hi}S_i X_i) + \sum_i (w_{hi}T_i) + b_h; \quad (35)$$

$$= \sum_i (W_{hi}X_i) + B_h; \text{ where} \quad (36)$$

$$W_{hi} = w_{hi}S_i; \text{ and} \quad (37)$$

$$B_h = \sum_i (w_{hi}T_i) + b_h. \quad (38)$$

Similarly, $$y_o = \sum_h (w_{oh} z_h) + b_o; \tag{39}$$

$$S_o * Y_o + T_o = \sum_h (w_{oh} z_h) + b_o; \tag{40}$$

$$Y_o = \sum_h [(w_{oh}/S_o) z_h] + (b_o - T_o)/S_o; \text{ and} \tag{41}$$

$$Y_o = \sum_h (W_{oh} z_h) + B_o; \text{ where} \tag{42}$$

$$W_{oh} = \frac{w_{oh}}{S_o}; \tag{43}$$

$$B_o = \frac{(b_o - T_o)}{S_o}. \tag{44}$$

Indeed, while the original neural network having parameters $w_{hi}$, $b_h$, $w_{ho}$, and, $b_o$ maps the scaled inputs $x_i$ to the scale outputs $y_o$, the transformed neural network 60 having parameters $W_{hi}$, $B_h$, $W_{ho}$, and $B_o$ maps the raw inputs $X_i$ to the raw outputs $Y_o$. Such mapping may be capable of improved speed during run time of the model 14, as well as improved use of resources such as processing cycles and memory. By incorporating the techniques described herein, including activation functions that have been selected due to their asymptotic properties, the neural network 60 embodiments may be capable of enhanced extrapolation behaviors, such as those described in FIG. 6, and improved run time performance.

FIGS. 5 and 6 illustrate the results of utilizing the activation functions $f(x)=\tan h(x)$ and $f(x)=1/(1+\exp(x))$, respectively. In FIGS. 5 and 6, the data is generated by the equation data=$0.01*x^2$. That is, the system 12 is being modeled as a polynomial so as to test the ability of the neural networks to predict the resulting output. FIG. 5 shows the results of a neural network that does not incorporate the techniques described herein. Graph 68 of FIG. 5 shows the output of the trained neural network over a training data where the training data has been restricted to an ordinate range [0.0, 1.0] and an abscissa range [−10, 10]. The neural network adequately predicts the outputs of the system 12 over the training data. Indeed, graph 68 shows that the neural network fits the trained data very precisely. That is, the predicted output 70 fits over the training output 72. Neural networks are known to exhibit universal approximation properties over their training data. In other words, the neural network may be designed and/or trained to fit the quadratic training data to any desired degree of accuracy. However, traditional neural networks may not extrapolate well outside of the training data. Graph 74 shows the predictive deficiencies of the neural network over a test data set. The test data set includes an ordinate range [0, 100] and an abscissa range [−100, 100]. The neural network not utilizing the techniques described herein incorrectly predicts an asymptotically flat output 76 whereas the actual output should be the curve 78.

The higher order behaviors of the neural network are illustrated in graph 80. As expected, the gain shows a well defined, increasing gain profile 82 over the training data. By way of contrast, graph 84 shows a gain profile 86 that trends to zero gain outside of a narrow training band. Such zero trending behavior would be detrimental if used in, for example, controller embodiments. Indeed, such zero trending behavior may result in infinite controller gains.

FIG. 6 shows the results of a neural network 60 that incorporates the techniques described herein, including the use of asymptotic analysis to choose a non-sigmoidal activation function $f(x)=1/(1+\exp(x))$. Graph 88 depicts the output of the trained neural network 60 over the training data where, as described above, the training data has been restricted to an ordinate range [0.0, 1.0] and an abscissa range [−10, 10]. The neural network 60 also adequately predicts the outputs of the system 12 over the training data. Indeed, graph 88 shows that the predicted output 90 fits the actual output 92 very precisely. Moreover, graph 94 shows that behavior of the trained neural network 60 over the test data, where the test data also consists of the ordinate range [0, 100] and the abscissa range [−100, 100]. It is clear that the predicted output 96 is no longer flat and that the predictive output 96 shows asymptotic trending of the activation function. Further, the trained neural network 60 shows a much improved extrapolation behavior not only over the predicted output but also over higher order properties of the neural network 60.

Graph 100 shows a gain profile 102 of the trained neural network 60 over the training data. The gain profile 102 is similar to the gain profile 82 in that the gain profile 102 is well defined, and not trending to zero. Further, graph 104 illustrates a much improved gain profile 106 over the test data. As illustrated, the gain profile 106 is also better defined and no longer trending towards zero. Accordingly, the neural network 60 incorporating techniques such as asymptotic analysis and use of unscaled data may be substantially more useful in, for example, control embodiments. Indeed, such techniques may be useful in other embodiments such as support vector machines.

FIG. 7 illustrates and embodiment of a support vector machine (SVM) 108. SVMs, like neural networks, may be architected and/or trained on a set of data so as to achieve universal approximator properties. Accordingly, the SVM 108 may be included in the model 14. A linear or nonlinear system f(x) may be approximated using the SVM 108 as follows:

$$f(x) = w^T \phi(x) + b. \tag{45}$$

The equation (45) may be deemed the primal equation for the approximation of f(x), where w and b are the weight and basis coefficients, respectively, and $\phi(x)$ is the primal kernel function used for the approximation. Given N set of input/output measurements, the approximation error $f(x)-(w^T\phi(x)+b)$ may be captured with various loss functions. In one embodiment, the loss function is as follows:

$$\min_{\{w,b,\zeta^+,\zeta^-\}} \mathcal{J}(w, b, \zeta^+, \zeta^-) = \frac{1}{2} w^T w + c \sum_{k=1}^{N} \{\zeta_k^+ + \zeta_k^-\}; \tag{46}$$

subject to:

$$\begin{cases} f(x_k) - \left[w^T \phi(x_k) + b\right] \leq \zeta_k^+ + \varepsilon, \zeta_k^+ \geq 0, \text{ for } k=1,\ldots N \\ -f(x_k) + \left[w^T \phi(u_k) + b\right] \leq \zeta_k^+ + \varepsilon, \zeta_k^- \geq 0, \text{ for } k=1,\ldots N \end{cases}. \tag{47}$$

The constrained optimization problem described in equations (46) and (47) above may be deemed the primal problem. The primal problem may use a preselected basis/kernel function $\phi$, to yield the w and b coefficients. Additionally, the constant c of equation (46) may be a positive real constant and may be used as a tuning parameter. $\varepsilon$ is the desired accuracy level, and $\zeta_k^+$, $\zeta_k^-$ are slack variables.

In another embodiment, the optimization problem may be defined as follows:

$$\max_{\{\infty,\infty^*\}} Q(\infty, \infty^*) = -\frac{1}{2}\sum_{k,l=1}^{N}(\alpha_k - \alpha_k^*)(\alpha_l - \alpha_l^*)K(x_k, x_l); \quad (48)$$

$$= -\varepsilon\sum_{k=1}^{N}(\alpha_k + \alpha_k^*) + \sum_{k=1}^{N}f(x_k)(\alpha_k - \alpha_k^*); \quad (49)$$

subject to:

$$\left\{ \begin{array}{l} \sum_{k=1}^{N}(\alpha_k - \alpha_k^*) = 0 \\ \alpha_k, \alpha_k^* \in [0, c] \end{array} \right\}; \quad (50)$$

Where $K(x_k, x_l) = \phi^T(x_k)\phi(x_l)$ is the basis/kernel function for the optimization problem, and $\alpha_k$ and $\alpha^*_k$ are Lagrange multipliers. Furthermore, the function f(x) may alternatively be defined as:

$$f(x) = \sum_{k,l=1}^{N}(\alpha_k - \alpha_k^*)K(x_k, x_i) + b. \quad (51)$$

An added advantage of the embodiment utilizing equations (48)-(51) is that the embodiment may be augmented with explicit constraints on the gain bounds on the SVM 108. Indeed, the asymptotic behavior of the basis/kernel functions may now be explicitly analyzed and incorporated into the SVM 108. The SVM 108 may then be optimized and the gain bounded by incorporating the final gains of the trained SVM 108 explicitly as a function of its inputs. The SVM 108 may be trained, for example, through the use of the logic 40 of FIG. 3. The gain's maximum and minimum may be found by solving an optimization problem with the gain as the objective function and the SVM 108 inputs as the decision variables. The inputs can be defined to a domain (e.g., train, test, unbounded) to obtain the precise maximum and minimum gains for the intended operating region. In one embodiment, the gain bounds may be formulated as hard constraints, as shown in equation (30). In another embodiment, the gain bounds may be formulated as penalty functions. Such enhanced capabilities allow the SVM 108 to exhibit superior extrapolation properties. It is to be noted that the techniques described with respect to the SVM 108 may also apply to other empirical modeling approaches such as neural networks.

The empirical modeling techniques described herein may also be enhanced by imparting general first-principles information and/or process knowledge into an empirical model via general constrained training. In other words, the empirical models may be trained with training data while also being subject to general constraints. First-principles (FP) models are generally built upon the science behind a particular process, and hence are generally well suited for representing the general process behavior over an entire operation regime. In other words, because the FP models tend to define the underlying mathematical relationships between variables of a process, the FP models theoretically provide more accurate results over all operating regimes of the process. However, FP information is often incomplete or inaccurate. For example, in certain situations, all of the fundamental interactions of a process may either not be known or are not easily representable using underlying mathematical equations. As such, tuning the parameters of the models is necessary before the models may be reliably used for optimization and/or control. In addition, FP models are typically relatively computationally expensive, and hence useful for real-time optimization and/or control in only relatively slower processes. This is particularly relevant when the outputs of the FP models are not explicit. In addition, when a process changes, modification of the corresponding FP model is most often required, sometimes necessitating designed experiments to obtain the necessary data.

The empirical modeling techniques described herein may be more accurate than FP modeling when actual data is available insofar as the data captures non-idealities of the real process, which may not be represented in the FP models. The available data, however, is often quite correlated and process data alone may not be sufficient to unambiguously represent the correlations. This is particularly evident when the process operation is recipe-dominated. Additional designed experiments are often needed in order to produce the necessary data for system identification. However, designed experiments disrupt the normal operation of the plant and hence are somewhat undesirable. In addition, certain regions of operations are typically avoided and, as such, representative data for that region will not be available.

As such, because of the complementary strengths and weaknesses of the two modeling techniques (i.e. FP modeling and empirical modeling), it may be desirable to combine them. However, developing systematic and practical computational methodologies combining the two approaches presents certain challenges. As described in greater detail below, general FP information and/or process knowledge may be imparted into an empirical model via general constrained training, wherein an empirical model is trained with training data while also subject to general constraints. The constraints are imposed not only over regions where training data is available, but over the entire input space upon which the empirical model is defined. While the techniques described herein are generally discussed in terms of neural networks, the techniques are applicable to any kind of empirical model, non-parametric or otherwise, including SVMs, relevance vector machines (RVMs), radial basis functions (RBFs), kriging, splines, linear regression models, generalized linear models, generalized additive models, and so forth.

The embodiments described herein provide an automatic method for realizing the powerful modeling capabilities of combining FP modeling and empirical modeling. Conventionally, certain neural networks have been trained with globally enforced constraints, but only for a single kind of constraint. Gain constraints are one type of globally enforced constraint that relates to only one type of constraint. Gain constraints simply limit the values of a single gain (where gain is defined as the partial derivative of an output $Y_m$ with respect to an input $u_i$). Other techniques utilize a constrained optimizer trainer that can handle constraints of any (differentiable) form, known herein as general constraints. However, such trainers do not automatically enforce constraints globally. In contrast, the embodiments described herein solve the practical computational difficulties involved in globally enforcing general constraints.

In particular, the embodiments described herein augment empirical models with a priori knowledge, obviating conventional restrictions that enable only placing bounds on gains. For example, the embodiments described herein enable two different constrained gains to always be equal to each other without explicitly determining what the gain value should be (which is a common scenario with parallel equipment). As described herein, for any general differentiable function being used as a constraint, a Taylor series expansion of the general constraint may be created, and each term in the Taylor series expansion may be imposed as a constraint until the deviation from the constraint function is below some desired tolerance level. Thus, the embodiments described herein offer a methodology for constraint training under general differentiable functions. Furthermore, the embodiments described herein create a clear certificate of the tradeoffs between the general constraints imposed on the empirical model, assisting the analysis of the trained model.

The embodiments described herein overcome the computational difficulties involved in creating a system to automatically train models subject to general constraints that are enforced globally. The methods apply to any such problems, but it is especially important that they apply to problems dominated by real-world data. Two types of algorithmic devices and discoveries contributed to overcoming the computational difficulties. First, techniques to allow constrained training problems to be formulated such that a constrained optimizer can execute and solve them have been developed. In general, conventional optimizers cannot run constrained training problems with larger real-world datasets when they are formulated in a straightforward manner. The algorithmic techniques described herein re-express the given problem to allow its formulation to be one that a constrained optimizer can run and converge, and thereby solve the given problem. Second, techniques to achieve global enforcement of the general constraints in the trained model have been developed. Conventional formulations enforce constraints only in the regions containing training data, whereas the constraints should be enforced everywhere within the model. The embodiments described herein enable both a workable and a dimension-independent strategy for globally enforcing the general constraints.

The automatic system disclosed herein transforms a set of training data and a set of general constraints into an appropriately trained empirical model subject to general constraints, where the constraints are globally enforced. The general constraints can represent information known from first-principles models and process experience, and the term "global" is defined as something less than, but reasonably approximating, the entire model space. The system generally consists of two stages. First, a set of filter functions takes in the training data and the general constraints, and produces the appropriate data points and constraint enforcement points. Then, a formulation of the optimization problem is constructed and supplied to a constrained optimizer, which produces the trained model with the constraints enforced globally. All of this may be automated in certain embodiments.

As described above, correlations in the training data from the various input variables may cause the data to only partially cover the model space. In conventional modeling techniques, there are typically many regions devoid of training data in the input or model space. Thus, it is these correlations in the data that create the need to enforce the constraints globally (i.e., beyond the data regions). When a user specifies a constraint, the user intends for it to be enforced globally, and not just in the regions where training data exists. This is true for at least three reasons. First, it is the logically desired behavior. Trained models deployed in projects typically need to supply answers at places outside the regions they were trained. Second, a user specifying a constraint to be imposed on a model usually expects it to be enforced globally. Third, this expectation is bolstered by the fact that conventional systems globally enforce simple gain constraints. The user will naturally expect this same behavior of general constraints and of associated optimizer trainers.

Semi-Infinite Programming

A constraint can only be applied to (e.g., enforced at) a finite set of discrete points. A model space, in contrast, is a continuous region, made up of an infinite number of points. Therefore, to globally enforce a constraint over a model space means to enforce it at enough points in the model space that it will also be applicable everywhere between those points. The problem of enforcing a constraint on a continuous region may be referred to as a semi-infinite programming problem. Again, a practical method of accomplishing this is to apply the constraint to a finite set of discrete points sampled from the region. In any practical situation, if the points are sufficiently close together, then the constraint will also hold between the sampled points. Exactly how close together is sufficient depends on the particulars of the problem. In a neural network, it depends at least on the number of hidden units, the nature of the problem, and the detailed behavior of the trainer and the training process. Therefore, the problem of how to globally enforce general constraints reduces to a problem of finding a minimal set of points from the model space such that enforcing the general constraints at those points will also result in enforcing the general constraints globally.

In general, a new sample of points may be chosen at each epoch. In a single epoch, the constraints will not usually become fully enforced at any of these points, and it is unlikely that any exact point will be sampled more than once. Yet, over time, this overall stochastic process enforces all of the gain constraints fully and globally. A constrained optimizer, however, is deterministic. A single sample of points may be used, and may be fixed throughout the training. This single sample has to contain enough points to result in global enforcement, but contain few enough points for the optimizer to be able to run. In general, uniform sampling covers the model space but yields too many points. It should be noted that random uniform sampling also produces many redundant points, but low-redundancy sequences may remove this redundancy.

Model Spaces

A model space is generally rectangular or cubic, where each side length is given by the size of the chosen range of the corresponding input variable. The model space is rectangular or cubic according to whether the side lengths are un-normalized or normalized to unit length. Its volume is given by the product of the side lengths. That is, the volume grows exponentially with the number of dimensions (e.g., inputs). FIG. 8 represents a model space 110 of a normalized model with three inputs. The model space 110 is represented as an ordinary three-dimensional (or 3 dim) cube 112. Its total boundary or surface is composed of three different types of component boundaries, the vertices 114, the edges 116, and the faces 118. The vertices 114 are 0dim, the edges 116 are 1 dim, and the faces 118 are 2 dim. In other words, their dimensions range from 0 to 2. The boundary of the cube consists of multiple instances of each type of component boundary (e.g., twelve vertices 114, eight edges 116, and six faces 118). All of these component boundaries add to 26. If, for mathematical convenience, you include the 3 dim cube 112 itself as one of its own boundaries, the total number of instances of all the kinds of component boundaries is 27, which is equal to $3^3$.

These relationships generalize in the obvious ways of D dimensions. The boundary of a D-dim cube has D types of component boundaries, each of a different number of dimensions ranging from 0 to D−1. The total number of instances of all component boundary types is $3^D$. Since the volume of a model space 110 grows exponentially with the number of dimensions, uniform sampling would yield an exponential number of points, which is not algorithmically tractable. However, it is possible to achieve global enforcement by enforcing the constraints only at points from certain regions of the model space 110. Again, the three-dimensional model space 110 illustrated in FIG. 8 (e.g., corresponding to a model with only three inputs) is merely exemplary as a simplified example to illustrate the techniques described herein. It will be appreciated that any given model may include D number of inputs, thereby being much more complex than the cube shape of the model space 110 illustrated in FIG. 8.

The Boundary of a Model Space

Two basic regions of a model space 110 are its interior and its boundary or surface. Constraints should be enforced at the training points, since they should certainly hold everywhere that data exists. Virtually all real-world training data lies in the interior of a model space 110 (except for the few points that lie directly on the boundary). As such, enforcing the constraints at the training data points, as well as at some points on the boundary of the model space 110 may enable global enforcement of the constraints.

Gains either directly on or close to the boundary of the model space 110 are particularly important because they are the ones most likely to be wrong, since the model values of the outermost points in the model space 110 are not anchored by training data points further out in the exterior direction from the model space 110. Because these gains on or near the boundary of the model space 110 are the most likely to be wrong, it is especially important to enforce gain constraints directly on the boundary. This is also true for general constraints.

Sampling the Boundary

The centers of the smaller-dimensional component boundary types are more distant from the center of the model space 110 (e.g., in a 3dim cube, the center of the faces 118 are the closest to the center of the cube, the centers of the edges 116 are next closest, and the vertices 114 are the most distant). Thus, the vertices 114 are essential to include as constraint enforcement points to achieve global enforcement. However, even if the vertices 114 alone were sufficient, there are generally too many vertices 114 alone for a constraint training optimizer to handle. For example, a model with 20 inputs has over a million (e.g., $2^{20}$) vertices 114. It would be feasible to include all of the vertices 114 if the dimension of the model is sufficiently small, but for larger-dimensional models, only a sample of vertices 114 may be used. Furthermore, again, the vertices 114 are only one of the D types of component boundaries (e.g., the 0 dim type).

Again, the most practical computational approach to this problem is to enforce the constraints at a finite set of discrete points. Therefore, it is important to determine whether it is necessary to sample points from not only the vertices 114 but also from every other type of component boundary, and from every instance of each. Sampling even a single point from every instance of every boundary type will most likely prove intractable insofar as it would yield enforcement points. For example, a model with 20 inputs has $3^{20}$, or over 3.5 billion, boundaries (e.g., total instances of component boundaries). Therefore, it is important to consider whether instances of only certain component boundary types will suffice, how many instances of how may boundary types will suffice, and which boundary types matter the most.

Sampling Frequencies and Volume Distribution in High-Dimensional Model Spaces

Uniformly sampling a high-dimensional model space 110 automatically reflects what might otherwise be interpreted as strange distribution of volume in high-dimensional model spaces 110. In very high-dimensional model spaces 110, the volume is concentrated near the surface of the model space 110 as if the interior disappears. The same kind of effect occurs in high-dimensional rectangles or cubes. It can be shown that the volume of a cube becomes increasingly concentrated not just at the surface, but in its large number of corners, which themselves increasingly become very long spikes with the vertex points at their tips.

Returning to the D-dimensional cube illustrated in FIG. 8, for convenience, it may be presumed that the edges 116 have been normalized to unit length. To uniformly and randomly draw a point or D-dimensional vector from such a model space 110, one may independently choose D random component values from the interval [0, 1]. As D grows, the odds become increasingly high that at least one of the components will lie close to either 0 or 1. Equivalently, the random vector itself lies close to the boundary, thus mimicking the high-dimensional geometry. If any component is exactly 0 or 1, then the vector lies directly on the boundary. The odds of this happening are infinitely less than the odds that a component is simply near 0 or 1 (i.e., that the vector is simply near the boundary). Hence, random vectors lying directly on the boundary are very rarely chosen. Any one component exactly equaling 0 or 1 would put the vector on a face 118 (i.e., the highest-dimensional boundary type), any two components would put the vector on an edge 116 (the next smallest-dimensional boundary type), and so on. Thus, the odds of exactly hitting a given type of boundary decreases as the dimension of the boundary type decreases. The smallest-dimensional boundary type is the vertex 114, which corresponds to every component being exactly 0 or 1, which very rarely happens. In summary, therefore, a randomly chosen set of D-dimensional points (e.g., vectors) very rarely contains any boundary vectors at all, and essentially never includes any vertices 114.

Summary of Global Enforcement Challenges

Therefore, to summarize, the constrained training optimization problems may be formulated such that an optimizer (e.g., an optimization software module of the industrial controller 10 described above) may successfully run and converge them in useable time. The sampling from the model space 110 may include a number of points that is small enough to run, yet large enough to enforce the constraints globally. More specifically, a non-exponential number of points might possibly globally enforce the constraints. In addition, it may be possible to globally enforce the constraints by enforcing them on the training data points, which lie overwhelmingly in the interior of the model space 110, together with some points sampled from the boundary. Furthermore, the volume of a model space 110 depends exponentially on the number of dimensions, and the boundary of a model space 110 consists of exponentially many instances of component boundaries. It may be possible for a non-exponential number of boundary points to enforce the constraints globally on the boundary. Moreover, the vertices 114 are the points on the boundary most distant from the training sample and, as such, would very likely be needed in the enforcement sample to enforce the constraints globally. It may be possible to sample other types of component boundaries in addition to the vertices 114. However, in certain embodiments, all of the vertices 114 (e.g., all of the lowest-dimensional boundary type points of the model space 110) may be used, whereas only a subset of the other boundary types may be used.

An automatic method is presented herein for training a neural network or any other empirical model with general constraints, meaning that the form of the constraints is not limited. The domain of applicability of the method includes real-world data-centric problems and any kind of empirical model, perhaps typically but not necessarily non-parametric, including RVMs, SVMs, RBFs, kriging, splines, linear regression models, generalized linear models, and so forth. The accuracy of constrained training subject to general constraints hinges on, among other things, (a) algorithmic techniques to enable the optimization problem to be re-expressed in a formulation that will run and converge in a useable time period, and (b) proper selection of both constraint enforcement data points and training data points.

As described above, uniformly sampling points for constraint enforcement from the entire model space 110 quickly results in prohibitively large optimization problems. This causes convergence of the training optimization problem to be either impossible, or to require too much time to be usable. The embodiments described herein include a problem-independent method for selecting from the model space 110 a set of points for constraint enforcement that is large enough to reliably enforce the gains globally, and yet small enough to enable reliable training in a usable amount of time. One enabling methodology for data selection is to assign a probability value for data points included in the sample data, and then use the assigned probability distribution function to guide a random sampling of the data points. Such probability-guided random sampling offers sufficient data points for the constrained training of the empirical model, the quality of which could be tested against a second probability-guided sampled data set. It should be noted that the process of determination of suitable data points and systematic inclusion of these data points in the training problem may be automated in certain embodiments (e.g., via online adaptation of the empirical model). In this scenario, a measure of model quality may be reported to the user in a variety of ways, including a graphical representation of the model quality, which may be consumed by other computer programs or human operators.

In addition, the manner by which generalized constraints are included in the training of the empirical model critically impacts the success of the training algorithms. A problem-independent way of automatically formulating the optimization problem in a trainable manner, including the calculation of associated coefficients, is implemented as described herein. One enabling methodology is to avoid simplistic addition of constraints at sampled data points into the constraint set for constrained optimization of the training of the model. One such methodology is to augment the objective function with proper weighting of the constraints in the sampled data point. The weighting coefficients for the additional terms in the objective function could be automatically adjusted in certain embodiments. One possible approach for this automatic tuning is the use of sensitivity information, which may be calculated by the solver.

Regarding the training data points, it has been shown that an abundance of training data points beyond some threshold does not at all correlate with improved model quality and, indeed, typically worsens it. The embodiments described herein enable automatic reduction of the training data set, as necessary, to include an appropriate number of points, as well as which specific points are best to use. One enabling methodology for systematic reduction of the selected data points is to use Lagrangian information to rank the significance of the data points included in the training problem.

In certain embodiments, the resulting empirical model 14, which is constrained with general constraints and trained with training data in the manner described above, may be deployed such that a validity of the empirical model 14 may be ascertained at any time. For example, in certain embodiments, the validity of the empirical model 14 may represent a degree of statistical conformity of the empirical model 14 with actual operating data received from the modeled system 34. If the empirical model 14 does not meet a certain minimum threshold of conformity with the actual modeled system 34, the empirical model 14 may be re-trained with additional training data. In certain embodiments, the validity of the empirical model 14 may be ascertained automatically by the industrial controller 10 (e.g., when the empirical model 14 is deployed, after a short time period following deployment of the empirical model 14, and so forth). In other embodiments, the validity of the empirical model 14 may be ascertained in response to a prompt received from an operator of the industrial controller 10 (e.g., via an interface of the industrial controller 10, or another automation control device connected to the industrial controller 10).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    formulating, using a control circuit, an optimization problem used to determine a plurality of model parameters of an empirical model configured to model operation of a system, wherein formulating the optimization problem comprises:
        determining an objective function describing a relationship between the model parameters and operational parameters of the system; and
        determining general constraints on the model parameters, the operational parameters, or any combination thereof; and
    solving, using the control circuit, the optimization problem to define the empirical model subject to the general constraints used to control operation of the system by:
        randomly selecting a plurality of vectors in a model space upon which the empirical model is defined; and
        determining the model parameters such that the general constraints are enforced at each of the plurality of vectors.

2. The method of claim 1, wherein the general constraints are enforced over the entire model space.

3. The method of claim 2, comprising applying weights to the general constraints for data points in the model space.

4. The method of claim 1, wherein randomly selecting the plurality of vectors comprises selecting the plurality of vectors such that the general constraints are enforced across the entire model space.

5. The method of claim 4, wherein selecting the plurality of vectors comprises assigning a probability value to vectors in the model space.

6. The method of claim 4, wherein selecting the plurality of vectors comprises determining a subset of boundary types of the model space.

7. The method of claim 6, wherein selecting the plurality of vectors comprises selecting a vector from a lowest-dimensional boundary type of the model space.

8. The method of claim 1, comprising defining a first asymptotic behavior of the empirical model by observing a second asymptotic behavior of the system to be modeled.

9. The method of claim 1, wherein each of the general constraints are represented as a Taylor series expansion, and each term of the Taylor series expansion is enforced as a constraint when solving the optimization problem.

10. The method of claim 1, wherein the empirical model comprises a neural network, a support vector machine, or a combination thereof.

11. An industrial controller, comprising:
an empirical model configured to model operation of a system such that the empirical model describes a first asymptotic behavior that conforms to a desired second asymptotic behavior of the system, wherein the empirical model is subject to general constraints on model parameters of the empirical model, operational parameters of the system, or any combination thereof, wherein the general constraints comprise first-principles information and process knowledge.

12. The industrial controller of claim 11, wherein the general constraints are enforced over an entire model space upon which the empirical model is defined.

13. The industrial controller of claim 12, wherein the general constraints are enforced on a minimal set of training data points in the model space when training the empirical model to ensure that the general constraints are enforced across the entire model space.

14. The industrial controller of claim 13, wherein the minimal set of training data points in the model space comprise a subset of boundary types of the model space.

15. The industrial controller of claim 14, wherein the minimal set of training data points comprises data points from a lowest-dimensional boundary type of the model space.

16. A tangible, non-transitory, computer-readable medium configured to store instructions executable by processing circuitry, wherein the instructions comprise instructions to:
determine, using the processing circuitry, an asymptotic behavior of a system based at least in part on operational parameters of the system;
determine, using the processing circuitry, a basis/kernel function based at least in part on the asymptotic behavior of the system;
formulate, using the processing circuitry, an optimization problem to determine a plurality of model parameters of an empirical model configured to model operation of the system, wherein the empirical model comprises the basis/kernel function; and
solve, using the processing circuitry, the optimization problem to define the empirical model used to control operation of the system, wherein the empirical model is subject to general constraints on model parameters of the empirical model, operational parameters of the system, or any combination thereof.

17. The computer-readable medium of claim 16, wherein the general constraints are enforced over an entire model space upon which the empirical model is defined.

18. The computer-readable medium of claim 16, wherein the instructions to solve the optimization problem comprise instructions to:
randomly select a plurality of vectors in the model space of the empirical model; and
determine the model parameters such that the general constraints are enforced at each of the plurality of vectors.

19. The computer-readable medium of claim 18, wherein the instructions to randomly select the plurality of vectors comprise instructions to determine a subset of boundary types of the model space.

20. The computer-readable medium of claim 19, wherein the instructions to randomly select the plurality of vectors comprise instructions to select a vector from a lowest-dimensional boundary type of the model space.

21. A tangible, non-transitory, computer-readable medium configured to store instructions executable by processing circuitry, wherein the instructions comprise instructions to:
formulate, using the processing circuitry, an optimization problem used to determine a plurality of model parameters of an empirical model configured to model operation of a system, wherein the instructions to formulate the optimization problem comprise instructions to:
determine an objective function describing a relationship between the model parameters and operational parameters of the system; and
determine general constraints on the model parameters, the operational parameters, or any combination thereof; and
solve, using the processing circuitry, the optimization problem to define the empirical model subject to the general constraints used to control operation of the system, wherein the instructions to solve the optimization problem comprises instructions to:
randomly select a plurality of vectors in a model space upon which the empirical model is defined; and
determine the model parameters such that the general constraints are enforced at each of the plurality of vectors.

22. The computer-readable medium of claim 21, wherein the instructions to randomly select the plurality of vectors comprise instructions to select the plurality of vectors to ensure that the general constraints are enforced across the entire model space.

23. The computer-readable medium of claim 21, comprising instructions to define the empirical model such that the empirical model describes a first asymptotic behavior based at least in part on a second asymptotic behavior of the system.

* * * * *